US007227731B2

(12) United States Patent
Leith et al.

(10) Patent No.: US 7,227,731 B2
(45) Date of Patent: Jun. 5, 2007

(54) APPARATUS FOR OFFSET CORRECTING HIGH-SIDE AND LOW-SIDE SINKING/SOURCING OVER-CURRENT PROTECTION

(75) Inventors: James W. Leith, Seattle, WA (US); Gustavo J. Mehas, Mercer Island, WA (US); Brandon D. Day, Seattle, WA (US)

(73) Assignee: Intersil Americas Inc., Milpitas, CA (US)

( * ) Notice: Subject to any disclaimer, the term of this patent is extended or adjusted under 35 U.S.C. 154(b) by 475 days.

(21) Appl. No.: 10/875,697

(22) Filed: Jun. 24, 2004

(65) Prior Publication Data

US 2005/0207080 A1 Sep. 22, 2005

Related U.S. Application Data

(60) Provisional application No. 60/553,431, filed on Mar. 16, 2004.

(51) Int. Cl.
*H02H 7/00* (2006.01)

(52) U.S. Cl. .......................................... 361/93.1; 361/18

(58) Field of Classification Search .................. 361/18, 361/93.1; 323/276; 363/98
See application file for complete search history.

(56) References Cited

U.S. PATENT DOCUMENTS 5,502,610 A * 3/1996 Chaney ........................ 361/18
6,859,096 B2 * 2/2005 Tanaka et al. ................ 330/10

* cited by examiner

*Primary Examiner*—Brian Sircus
*Assistant Examiner*—Danny Nguyen
(74) *Attorney, Agent, or Firm*—Howison & Arnott, L.L.P.

(57) ABSTRACT

Apparatus for providing over-current protection in a power converter device includes a first circuit for providing high-side sinking over-current protection for the power converter device responsive to a phase signal and a high-side over-current signal of the power converter device. A second circuit provides low-side sinking over-current protection for the power converter device responsive to the phase signal and the low-side over-current signal of the power converter device. Finally, a third circuit provides low-side sourcing over-current protection responsive to the phase signal, the low-side over-current protection signal and a power ground signal of the power converter device.

23 Claims, 6 Drawing Sheets

APPARATUS FOR OFFSET CORRECTING HIGH-SIDE AND LOW-SIDE SINKING/SOURCING OVER-CURRENT PROTECTION

CROSS-REFERENCE TO RELATED APPLICATIONS

This application claims priority from U.S. Patent Provisional Application Ser. No. 60/553,431, filed Mar. 16, 2004 entitled "OFFSET CORRECTING HIGH-SIDE AND LOW-SIDE SINKING/SOURCING OVER-CURRENT PROTECTION."

TECHNICAL FIELD OF THE INVENTION

The present invention relates to over-current protection, and more particularly, to low offset, wide voltage range over-current sensing of both a high-side FET and low-side FET of a switching DC-DC PWM converter power stage.

BACKGROUND OF THE INVENTION

The protection from over-currents in power devices such as a switching DC-DC PWM converter power stage is highly desirable. Typical current sensing and protection devices in switching DC-DC PWM converter power stages normally uses either high-side over-current protection or low-side over-current protection. In most devices the use of high-side over-current protection is the only type of protection available. Low-side over-current protection while implemented in some multi-phase systems is not implemented within single phase parts, such as a DC-DC PWM converter power stage. When only high-side or low-side over-current protection is provided, over-current detection can be lost at either the high or low duty cycles depending on whether high-side or low-side detection is used. Furthermore, both low-side sinking and sourcing over-current protection are not provided in existing low-side over-current detection schemes.

It is also desirable to have DC-DC PWM converter power stages that are operable over a wide voltage range. However, existing devices of this type, when capable of operating over a wide voltage range such as 3V to 20V, will tend to have high offsets. When parts are designed having lower offsets, they are incapable of operating over a wider range of voltages. Thus, a voltage converter overcoming these limitations of the prior art will be of great benefit to DC-DC PWM converter designs.

SUMMARY OF THE INVENTION

The present invention disclosed and claimed herein, in one aspect thereof, comprises an apparatus for providing over-current protection in a power converter device. A first circuit provides high-side sourcing over-current protection to the power converter device in response to a phase signal and a high-side over-current signal of the power converter device. Second circuitry provides low-side sinking over-current protection responsive to the phase signal and a low-side over-current signal of the power converter device. Low-side sourcing over-current protection is provided by a third circuit responsive to the phase signal, the low-side over-current signal of the power converter device and a power ground signal of the power converter device.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
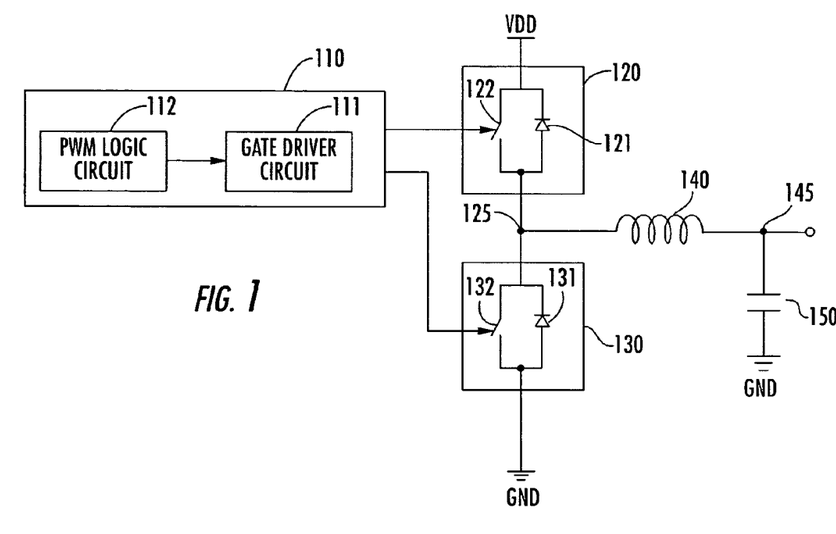
FIG. 1 illustrates the general circuit configuration of a conventional DC-DC voltage converter.

Referring now to the drawings, and more particularly to FIG. 1, wherein there is illustrated the general circuit configuration of a conventional DC-DC voltage converter as comprising a DC-DC controller 110, which fully controls the turn on and turn off of a pair of electronic power switching devices, respectively, shown as an upper FET pass element 120 and a lower FET pass element 130. These FET switching devices have their drain/source paths coupled in between first and second reference voltages VDD and ground (GND). Each pass element contains a controllable switch shown as an upper switch 122 and a lower switch 132. The upper pass element contains a body diode 121 in parallel with the drain/source path such that the reverse current flows through the body diode toward VDD. A lower pass element 130 contains a body diode 131 in parallel with the drain/source path such that the reverse current flows through body diode from ground. A common or phase voltage node 125 between the two power FETs 120/130 is coupled through an inductor 140 to a capacitor 150 coupled to a reference voltage (GND). The connection 145 between the inductor 140 and the capacitor 150 serves as an output node from which an output voltage $V_{OUT}$ is derived.

The DC-DC converter's controller 110 includes a gate driver circuit 111, that is operative to turn the two switching devices 120 and 130 on and off, in accordance with the periodic pulse signal wave form (typically, a pulse width modulation (PWM) switching wave form generated by a PWM logic circuit 112). The upper switch 122 is turned on and off by an upper gate switching signal UG applied by the gate driver 111 to the gate of the pass element 120, and the lower switch 132 is turned on and off by a lower gate switching signal LG applied to the gate driver 111 to the gate of the pass element 130.

Figure 1A:
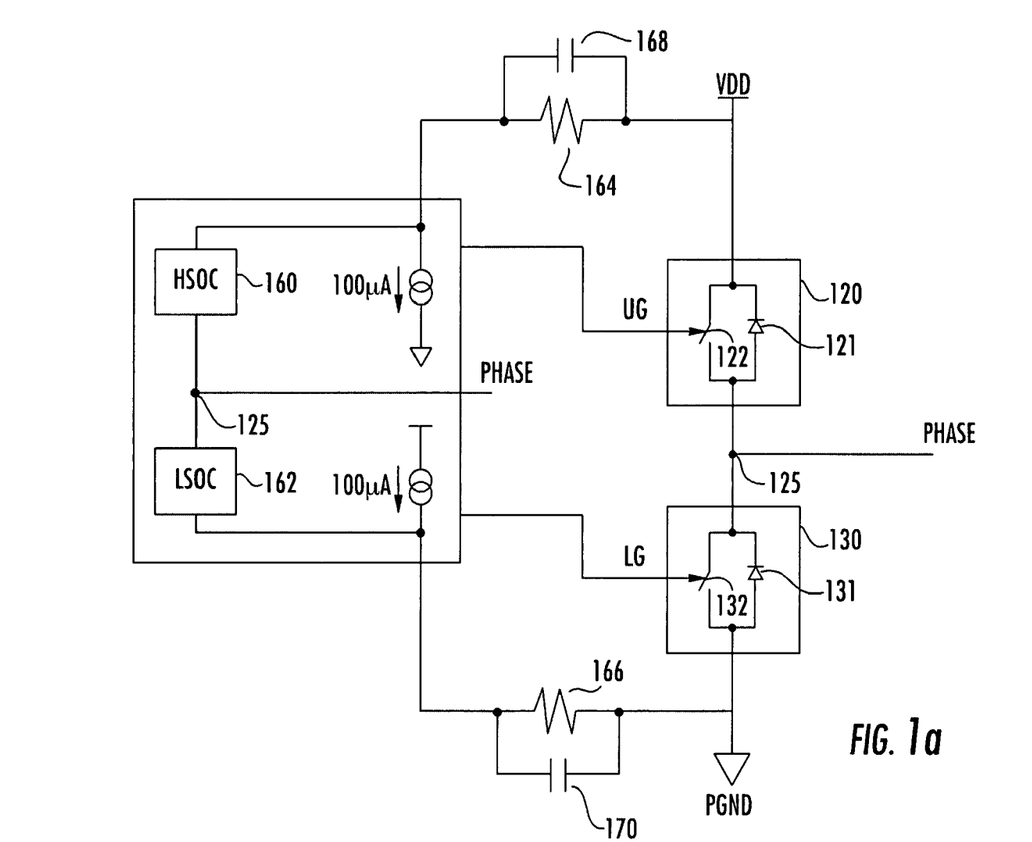
FIG. 1a illustrates the high-side and low-side over-currents in a DC-DC voltage converter.

FIG. 1a more fully illustrates the high-side and low-side over-currents established within the DC-DC voltage converter. Referring now to FIG. 1a, there is more fully illustrated how the high-side over-current 160 and the low-side over-current 162 set points are established by determining the desired voltage drop referenced with respect to the VDD supply for the high-side over-current set point and with respect to the power ground node for the low-side over-current set point. These current values are established by selecting values for resistors 164 and 166 to establish the desired high-side over-current and low-side over-current set points. The capacitors 168 and 170 are in the 100 pF–1 nF range to filter any ringing in the circuit.

Figure 2:
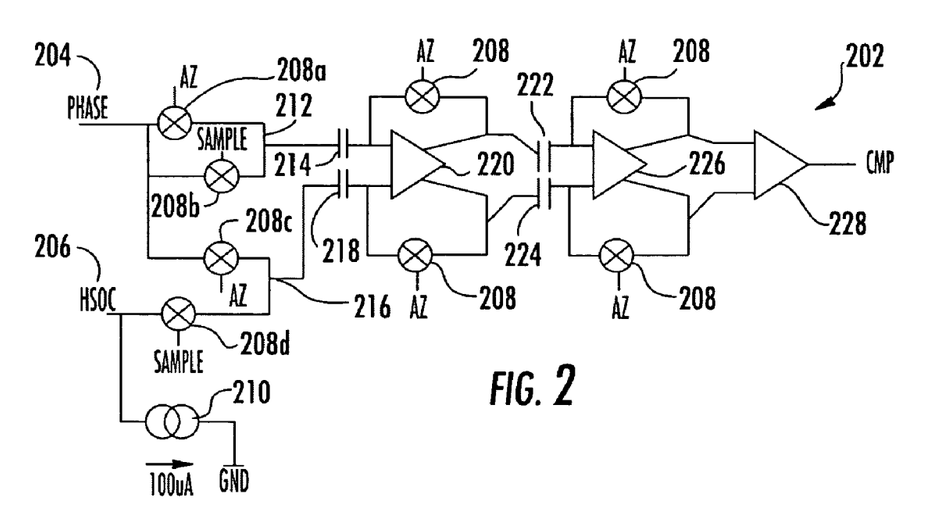
FIG. 2 is a block diagram of a circuit for providing high-side over-current "sourcing" sensing.

FIG. 2 illustrates a block diagram of a high-side "sourcing" over-current sensor 202. The over-current sensor 202 has a phase input 204 from the phase node 125 of the converter illustrated in FIG. 1 and an HSOC (high-side over-current) set point input, controlled by the "I×R" voltage drop referenced to the high-side pass element 120 positive supply VDD. The user sets the high-side over-current trip point by choosing the value of the resistor in the 500–2000 ohm range for a 50–200 mV trip point. Additionally, a control signal SAMPLE and control signal AZ are applied at a number of points within the high-side "sourcing" over-current sensor 202 in order to enable the circuitry when the high-side switch 120 is turned on and the low-side switch 130 is turned off. The control SAMPLE and AZ signals are applied to a number of control nodes 208. The input phase signal from the phase node 125 is applied to control nodes 208a, 208b and 208c. The HSOC signal 206 is applied to control node 208d. A 100 µA current source is located between the HSOC input and ground. During an AZ period, the phase input 204 passing through control node 208b stores a phase signal voltage value on capacitor 214. The AZ period sets the amplifiers 220, 226 in a Gain=1 mode for offset storage. Also, during the AZ period, HSOC signal 206 passing through control node 208d stores an HSOC voltage value on capacitor 218. The voltage values stored on capacitors 214 and 218 are applied to the inputs of differential amplifier 220 during the SAMPLE period. The voltage difference between the signals applied to the inputs of the differential amplifier 220 is amplified and the outputs of the differential amplifier 220 are stored on capacitors 222 and 224 as amplified voltage difference values. The differential amplifier 220 has a gain greater than or equal to 30. The basic operation of the differential amplifier 220 is to store offsets on the capacitors 214 and 218 during the AZ period and amplify the difference between the inputs of the differential amplifier 220 during a SAMPLE period.

The signals on capacitors 222 and 224 are applied to the inputs of differential amplifier 226 during a next AZ period. The voltage difference between the signals applied to the inputs of the differential amplifier 226 is again amplified during the SAMPLE period. The outputs of differential amplifier 226 are applied to the inputs of a comparator 228. The differential amplifier 226 also has a gain greater than or equal to 30. The differential amplifier 226 stores offsets on capacitors 222 and 224 during the AZ period and amplifies the difference between the inputs from these two capacitors during the SAMPLE period. Since the combined gain of the differential amplifiers 220 and 226 is equal to 900, input differences of less than 100 µV will cause the comparator to register the difference. The comparator 228 provides a logical "1" output as the CMP signal if the phase signal 204 is less than the HSOC signal 206. If the phase signal 204 is greater than the HSOC signal 206, a logical "0" signal is provided from the output of the comparator 228. The CMP signal is used to turn off the high-side FET in an over-current condition.

Figure 3:
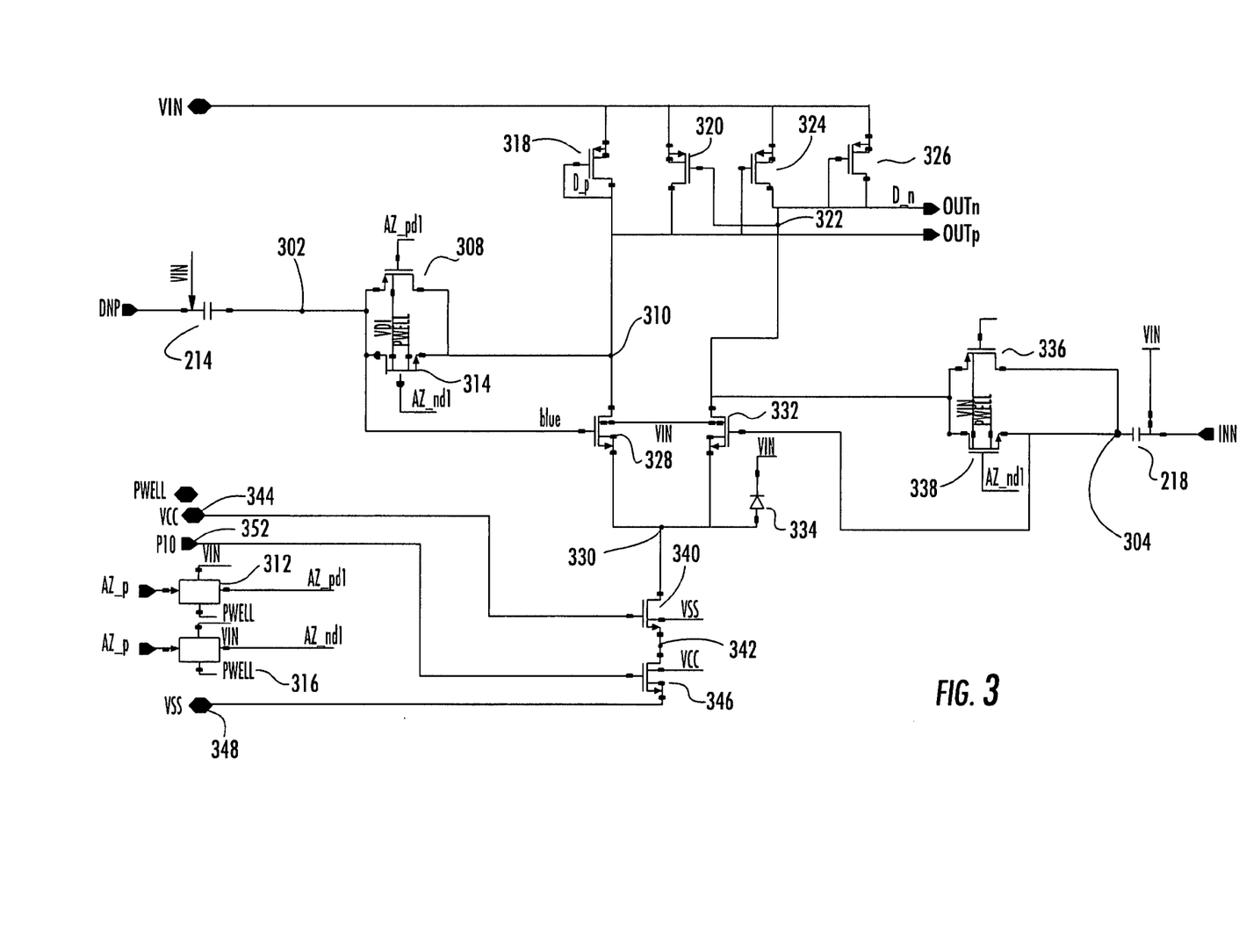
FIG. 3 is a schematic diagram of a high-side differential comparator.

Referring now to FIG. 3, there is illustrated a schematic diagram of one embodiment of the high-side differential amplifiers 220 and 226. The use of NDMOS devices allow a wide supply range of 2.5 V–36 V for the high-side differential amplifiers 220 and 226. The inputs from capacitors 214 and 218 are applied to nodes 302 and 304, respectively. The drain/source path of transistor 308 is connected between node 302 and node 310. The gate of transistor 308 is connected to buffer ______ delay element 312 which selectively turns on and off the transistor 308 responsive to the AZ control signal. The drain/source path of transistor 314 is connected between node 302 and 310. The gate of transistor 314 is connected to latch 316, which selectively turns on and off transistor 314 responsive to a control signal AZ. Transistor 318 has its drain/source path connected between $V_{IN}$ and node 310. The gate of transistor 318 is connected to its source node at node 310. The drain/source pathway of transistor 320 is connected between $V_{IN}$ and node 310. The gate of transistor 320 is connected to node 322. The drain/source path of transistor 324 is connected between $V_{IN}$ and node 322. The gate of transistor 324 is connected to node 310. Transistor 326 has its drain/source path connected between VIN and node 322. The gate of transistor 326 is connected to its own source node at node 322. The first and second outputs of the differential amplifiers 220, 226 are provided from nodes 322 and 310, respectively.

Transistor 328 has its drain/source path connected between node 310 and node 330. The gate of transistor 328 is connected to node 302. The drain/source path of transistor 332 is connected between node 322 and node 330. The gate of transistor 332 is connected to node 304. A diode 334 has its cathode connected to $V_{IN}$ and its anode connected to node 330. The drain/source path of transistor 336 is connected between node 304 and node 322. The gate of transistor 326 is connected to latch 312. Transistor 338 has its drain/source path connected between node 304 and node 322. The gate of transistor 338 is connected to latch circuit 316. Transistor 340 has its drain/source path connected between node 330 and node 342. The gate of transistor 340 is connected to VCC 344. Transistor 346 is connected between node 342 and VSS 348. The gate of transistor 346 is connected to P10 352.

Figure 4:
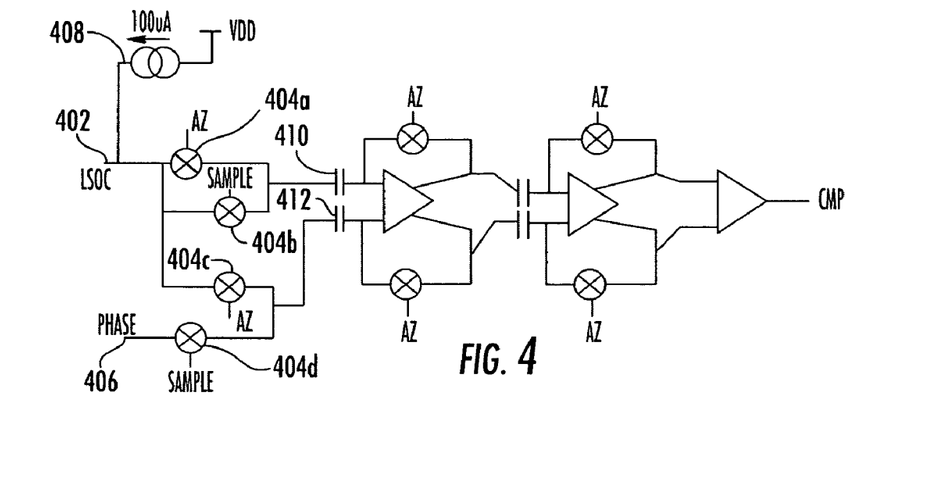
FIG. 4 is a block diagram of a circuit illustrating low-side over-current "sinking" sensing.

Referring now to FIG. 4, there is illustrated the circuit for low-side over-current "sinking" sensing. The low-side over-current signal input 402 is applied to the input of control nodes 404a, 404b and 404c. The phase signal input 406 is applied to the input of control node 404d. The phase signal of the phase signal input 406 comes from the phase node 125 of the DC-DC converter circuit of FIG. 1. Control signals AZ and SAMPLE are applied to a number of control nodes 404. A 100 µA current source 408 resides between the input of control node 404a and VDD. The output of control node 404a and control node 404b are connected to capacitors 410 and 412, respectively. Capacitor 410 stores a voltage value for the low-side over-current signal (LSOC) and capacitor 412 stores the voltage value for the phase node signal. The voltage values stored on capacitors 410 and 412 are applied to the inputs of differential amplifier 420 during a SAMPLE period. The voltage difference between the signals applied to the inputs of the differential amplifier 420 is amplified and the outputs of the differential amplifier 420 are stored on capacitors 422 and 424 as amplified voltage difference values. The differential amplifier 420 has a gain greater than or equal to 30. The basic operation of the differential amplifier 420 is to store offsets on the capacitors 410 and 412 during the AZ period and amplify the difference between the inputs of the differential amplifier 420 during a SAMPLE period. The AZ period sets the amplifiers 220, 226 in a Gain=1 mode for offset storage.

The signals on capacitors 422 and 424 are applied to the inputs of differential amplifier 426 during a next SAMPLE period. The voltage difference between the signals applied to the inputs of the differential amplifier 426 is again amplified during the SAMPLE period. The outputs of differential amplifier 426 are applied to the inputs of a comparator 428. The differential amplifier 426 also has a gain greater than or equal to 30. The differential amplifier 426 stores offsets on capacitors 472 and 424 during the AZ period and amplifies the difference between the inputs from these two capacitors during the SAMPLE period. Since the combined gain of the differential amplifiers 420 and 426 is equal to 900, input differences of less than 100 µV will cause the comparator to register the difference. The comparator 428 provides a logical "1" output as the CMP signal if the phase signal is greater than the LSOC signal. If the phase signal is less than the LSOC signal, a logical "0" signal is provided from the output of the comparator 428. The CMP signal is used to turn off the low-side FET in an over-current condition.

Figure 5:
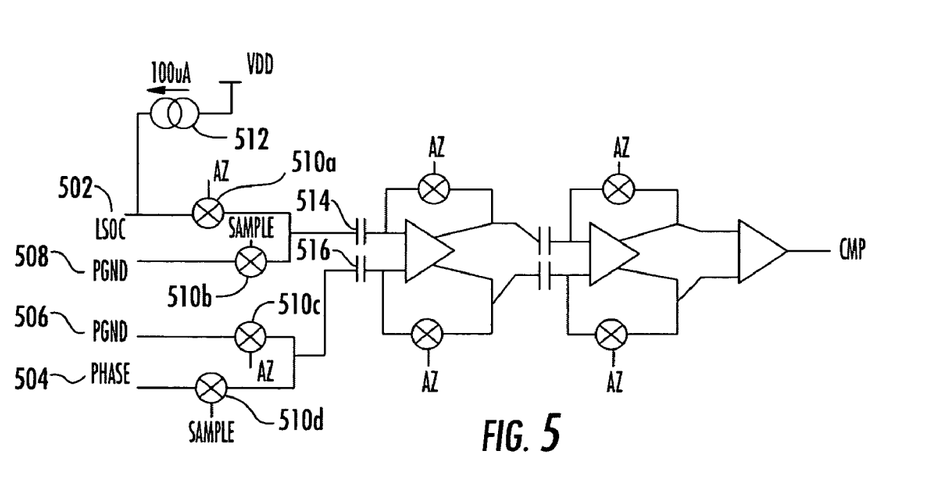
FIG. 5 is a block diagram of a circuit illustrating low-side over-current "sourcing" sensing.

FIG. 5 illustrates the circuit for providing low-side over-current "sourcing" sensing. The low-side over-current input 502 is connected to receive the low-side over-current signal. The phase input 504 receives the phase signal from the phase node 125 of the DC-DC converter. Power ground inputs 506 and 508 are connected to power ground and control nodes 510b and 510c, respectively. The LSOC input is connected to control node 510a, and the phase input 504 is connected to control node 510d. A 100 µA current source 512 is connected between VDD and the input of control node 510a. The difference between the voltage values of the low-side over-current signal and the power ground signal are stored on a capacitor 514 during the AZ period. The AZ period sets the amplifiers 220, 226 in a Gain=1 mode for offset storage. The difference between the power ground signal and the high-side over-current signal are stored on capacitor 518 during the AZ period. A voltage difference between the signals stored on capacitors 514 and 518 are applied to the inputs of differential amplifier 520 during a SAMPLE period. The voltage difference between the signals applied to the inputs of the differential amplifier 520 is amplified and the outputs of the differential amplifier 520 are stored on capacitors 522 and 524 as amplified voltage difference values. The differential amplifier 520 has a gain greater than or equal to 30. The basic operation of the differential amplifier 520 is to store offsets on the capacitors 514 and 518 during the AZ period and amplify the difference between the inputs of the differential amplifier 520 during a SAMPLE period.

The signals on capacitors 522 and 524 are applied to the inputs of differential amplifier 526 during a next SAMPLE period. The voltage difference between the signals applied to the inputs of the differential amplifier 526 is again amplified during the SAMPLE period. The outputs of differential amplifier 526 are applied to the inputs of a comparator 528. The differential amplifier 526 also has a gain greater than or equal to 30. The differential amplifier 526 stores offsets on capacitors 572 and 524 during the AZ period and amplifies the difference between the inputs from these two capacitors during the SAMPLE period. Since the combined gain of the differential amplifiers 520 and 526 is equal to 900, input differences of less than 100 µV will cause the comparator to register the difference. The comparator 528 provides a logical "1" output as the CMP signal if the difference between the LSOC signal and power ground is less than the difference between the power ground signal and the phase signal. If the difference between the LSOC signal and power ground is greater than the difference between the power ground signal and the phase signal, a logical "0" signal is applied from the output of the comparator 528. The CMP signal is used to turn off the low-side FET in an over-sourcing condition.

Figure 6:
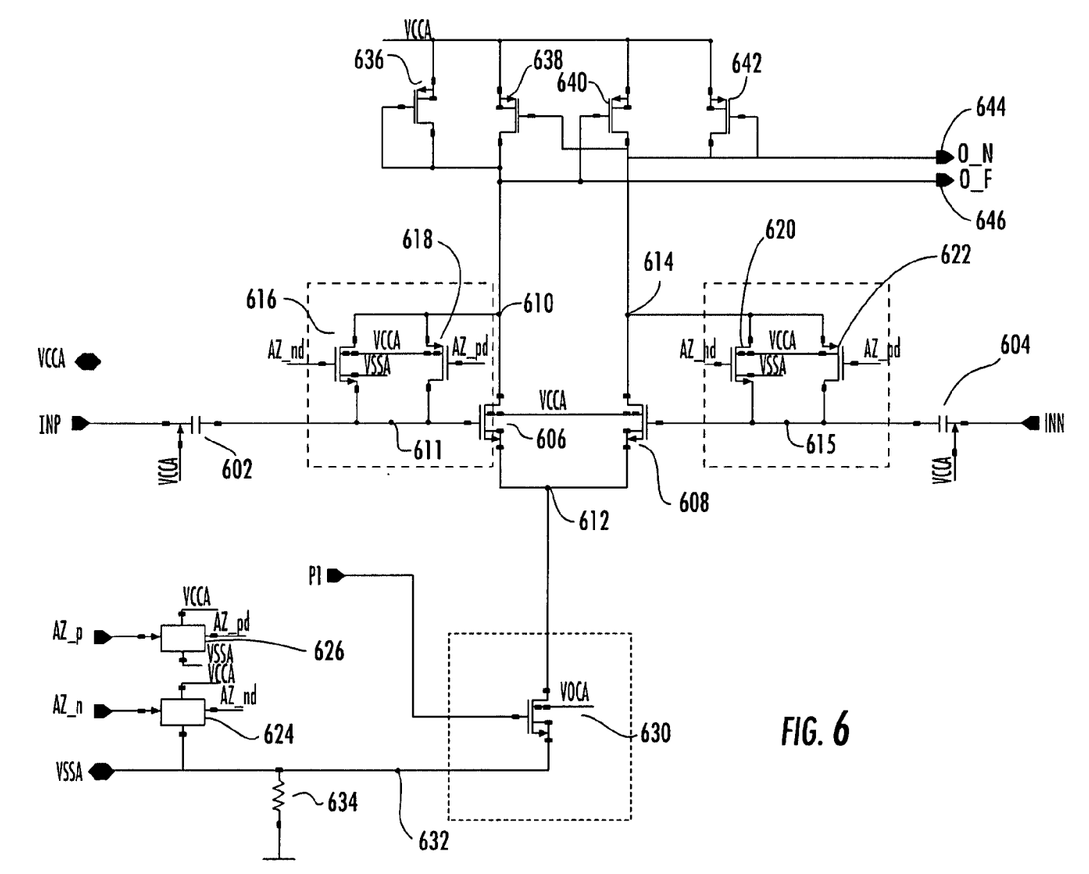
FIG. 6 is a schematic diagram of a low-side differential comparator.

Referring now to FIG. 6, there is illustrated a schematic diagram of the low-side differential amplifier used within the low-side over-current sourcing/sinking sensing circuits described with respect to FIGS. 4 and 5. Input capacitors 602 and 604, corresponding to the input capacitors connected to the inputs of the differential comparators described in FIGS. 4 and 5, are connected to the gates of transistors 606 and 608, respectively. The drain/source path of transistor 606 is connected between node 610 and node 612. The drain/source path of transistor 608 is connected between node 614 and node 612. Transistor 616 has its drain/source path connected between node 610 and node 611. The gate of the transistor 616 is connected to latch 624 that is responsive to the AZ control signal. Transistor 618 has its drain/source path connected between node 610 and node 611 and its gate is connected to latch 626 that is responsive to the AZ control signal. Transistor 620 has its drain/source path connected between node 614 and node 615. The gate of transistor 620 is connected to the latch 624 that is responsive to the AZ control signal. The drain/source path of transistor 622 is connected between node 614 and node 615, and the gate of transistor 622 is connected to latch 626. Transistor 630 has its drain/source path connected between node 612 and node 632. The gate of transistor 630 is connected to input P10. A resistor 634 is connected between node 632 and ground. Transistor 636 has its drain/source path connected between VCC and node 610. The gate of transistor 636 is connected to its drain at node 610. Transistor 638 has its source/drain path connected between VCC and node 610. The gate of transistor 638 is connected to node 614. The source/drain path of transistor 640 is connected between VCC and node 614. The gate of transistor 640 is connected to node 610. Finally, transistor 642 has its source/drain path connected between VCC and node 614. The gate of transistor 642 is connected to its drain at node 614. The outputs of the differential amplifier are provided over outputs 644 and 646, respectively, connected to nodes 614 and 610.

The herein above described circuit will provide a wide supply range over-current sensing circuit for both high-side and low-side "sourcing" over-current and low-side "sinking" over-current. The use of fully differential "offset" cancelling comparators provide higher accuracy while enabling operation of the power stage over a range of 1.8 V to 22 V. Additionally, the circuit operates down to low supply voltages and rejects common mode signals from inputs and supplies. This will enable both high-side and low-side over-current detection such that over-current detection is not lost at either high or low duty cycles as would happen if only the single type of over-current detection were used. Additionally, both low-side sinking and sourcing over-current protection are provided when presently available parts only provide high-side over-current protection. More accurate circuitries enable better accuracy when setting an over-current trip point so that designers are not required to over design for trip point inaccuracies. Low voltage operation is improved since comparators are essentially AC coupled such that they can maintain operation down to lower supplies. Finally, the fully differential comparators have less sensitivity to common mode signals on their inputs and supplies.

Although the preferred embodiment has been described in detail, it should be understood that various changes, substitutions and alterations can be made therein without departing from the scope of the invention as defined by the appended claims.

What is claimed is:

1. An apparatus for providing over-current protection in a power converter device, comprising:
   a first circuit for providing high-side sinking over-current protection, responsive to a phase signal and a high-side over-current signal of the power converter device;
   a second circuit for providing low-side sinking over-current protection, responsive to the phase signal and the low-side over-current signal of the power converter device; and
   a third circuit for providing low-side sourcing over-current protection, responsive to the phase signal, the low-side over-current signal of the power converter device and a power ground signal of the power converter device.

2. The apparatus of claim 1, wherein the phase signal and the high-side over-current signal are stored responsive to a first control signal and the difference between the phase signal and the high-side over-current signal is amplified responsive to a second control signal.

3. The apparatus of claim 1, wherein the phase signal and the low-side over-current signal are stored responsive to a first control signal and the difference between the phase signal and the low-side over-current signal is amplified responsive to a second control signal.

4. The apparatus of claim 1, wherein the difference between the low-side over-current signal and the power ground signal and the difference between the power ground signal and the phase signal are stored responsive to a first control signal and the difference between the low-side over-current signal and the power ground signal and the difference between the power ground signal and the phase signal is amplified responsive to a second control signal.

5. The apparatus of claim 1, wherein the first circuit begins high-side sinking over-current protection when the phase signal is less than the high-side over-current signal.

6. The apparatus of claim 1, wherein the second circuit begins low-side sinking over-current protection when the phase signal is greater than the low-side over-current signal.

7. The apparatus of claim 1, wherein the third circuit begins low-side sourcing over-current protection when a difference between the power ground signal and the low-side over-current signal is less than a difference between the power ground signal and the phase signal.

8. The apparatus of claim 1, wherein the first circuit further comprises:
   a first input for receiving the phase signal from a phase node;
   a second input for receiving the high-side over-current signal from a set node;
   a first capacitor for storing the phase signal from the phase node;
   a second capacitor for storing the high-side over-current signal from the set node;
   a first differential comparator for amplifying a difference between the phase signal and the high-side over-current signal;
   a third and fourth capacitors for storing an amplified difference between the phase signal and the high-side over-current signal from the first amplifier;
   a second differential comparator for further amplifying the amplified difference between the phase signal and the high-side over-current signal; and
   a comparator connected to the second differential comparator for generating an over-current protection signal at a first level if the phase signal is greater than the high-side over-current signal and generating an over-current protection signal at a second level if the phase signal is less than the high-side over-current signal.

9. The apparatus of claim 6, wherein signals are stored on the first, second, third and fourth capacitors responsive to a first control signal.

10. The apparatus of claim 7, wherein differences between the signals stored on the first, second, third and fourth capacitors are amplified responsive to a second control signal.

11. The apparatus of claim 1, wherein the second circuit further comprises:
   a first input for receiving the phase signal from a phase node;
   a second input for receiving the low-side over-current signal from a set node;
   a first capacitor for storing the phase signal from the phase node;
   a second capacitor for storing the low-side over-current signal from the set node;
   a first differential comparator for amplifying a difference between the phase signal and the low-side over-current signal;
   a third and fourth capacitors for storing an amplified difference between the phase signal and the low-side over-current signal from the first amplifier;
   a second differential comparator for further amplifying the amplified difference between the phase signal and the low-side over-current signal; and
   a comparator connected to the second differential comparator for generating an over-current protection signal at a first level if the phase signal is less than the low-side over-current signal and generating an over-current protection signal at a second level if the phase signal is greater than the low-side over-current signal.

12. The apparatus of claim 9, wherein signals are stored on the first, second, third and fourth capacitors responsive to a first control signal.

13. The apparatus of claim 10, wherein differences between the signals stored on the first, second, third and fourth capacitors are amplified responsive to a second control signal.

14. The apparatus of claim 1, wherein the third circuit further comprises:
   a first input for receiving the phase signal from a phase node;
   a second input for receiving the low-side over-current signal from a set node;
   second and third inputs connected to the power ground signal;
   a first capacitor for storing a first difference signal representing a difference between the low-side over-current signal and the power ground signal;
   a second capacitor for storing a second difference signal representing a difference between the power ground signal and the phase signal from the phase node;
   a first differential comparator for amplifying a difference between the first difference signal and the second difference signal;
   a third and fourth capacitors for storing an amplified difference between the first difference signal and the second difference signal;
   a second differential comparator for further amplifying the amplified difference between the first difference signal and the second difference signal; and
   a comparator connected to the second differential comparator for generating an over-current protection signal at a first level if the first difference signal is greater than the second difference signal and generating an over-current protection signal at a second level if the first difference signal is less than the second difference signal.

15. The apparatus of claim 12, wherein signals are stored on the first, second, third and fourth capacitors responsive to a first control signal.

16. The apparatus of claim 13, wherein differences between the signals stored on the first, second, third and fourth capacitors are amplified responsive to a second control signal.

17. An apparatus for providing over-current protection in a power converter device, comprising:
 a first circuit for providing high-side sinking over-current protection, responsive to a phase signal and a high-side over-current signal of the power converter device, wherein the first circuit begins high-side sinking over-current protection when the phase signal is less than the high-side over-current signal;
 a second circuit for providing low-side sinking over-current protection, responsive the phase signal and the low-side over-current signal of the power converter device, wherein the second circuit begins low-side sinking over-current protection when the phase signal is greater than the low-side over-current signal; and
 a third circuit for providing low-side sourcing over-current protection, responsive to the phase signal, the low-side over-current signal of the power converter device and the power ground signal of the power converter device, wherein the third circuit begins low-side sourcing over-current protection when a difference between the low-side over-current signal and the power ground signal is less than a difference between the power ground signal and the phase signal.

18. The apparatus of claim 15, wherein the phase signal and the high-side over-current signal are stored responsive to a first control signal and the difference between the phase signal and the high-side over-current signal is amplified responsive to a second control signal.

19. The apparatus of claim 15, wherein the phase signal and the low-side over-current signal are stored responsive to a first control signal and the difference between the phase signal and the low-side over-current signal is amplified responsive to a second control signal.

20. The apparatus of claim 15, wherein the difference between the low-side over-current signal and the power ground signal and the difference between the power ground signal and the phase signal are stored responsive to a first control signal and the difference between the low-side over-current signal and the power ground signal and the difference between the power ground signal and the phase signal is amplified responsive to a second control signal.

21. An apparatus for providing over-current protection in a power converter device, comprising:
 a first circuit for providing high-side sinking over-current protection, responsive to a phase signal and the high-side over-current signal of the power converter device, wherein the first circuit comprises:
  a first input for receiving the phase signal from a phase node;
  a second input for receiving the high-side over-current signal from the set node;
  a first capacitor for storing the phase signal from the phase node;
  a second capacitor for storing the high-side over-current signal from the set node;
  a first differential comparator for amplifying a difference between the phase signal and the high-side over-current signal;
  a third and fourth capacitors for storing an amplified difference between the phase signal and the high-side over-current signal from the first amplifier;
  a second differential comparator for further amplifying the amplified difference between the phase signal and the high-side over-current signal; and
  a comparator connected to the second differential comparator for generating an over-current protection signal at a first level if the phase signal is greater than the high-side over-current signal and generating an over-current protection signal at a second level if the phase signal is less than the high-side over-current signal;
 a second circuit for providing low-side sinking over-current protection, responsive to a phase signal and a low-side over-current signal of the power converter device, wherein the second circuit comprise:
  a first input for receiving the phase signal form a phase node;
  a second input for receiving the low-side over-current signal from a set node;
  a first capacitor for storing the phase signal from the phase node;
  a second capacitor for storing the low-side over-current signal from the set node;
  a first differential comparator for amplifying a difference between the phase signal and the low-side over-current signal;
  a third and fourth capacitors for storing an amplified difference between the phase signal and the low-side over-current signal from the first amplifier;
  a second differential comparator for further amplifying the amplified difference between the phase signal and the low-side over-current signal; and
  a comparator connected to the second differential comparator for generating an over-current protection signal at a first level if the phase signal is less than the low-side over-current signal and generating an over-current protection signal at a second level if the phase signal is greater than the low-side over-current signal;
 a third circuit for providing low-side sourcing over-current protection, responsive to a phase signal, a low-side over-current signal of the power converter device and the power ground signal of the power converter device, wherein the third circuit comprises:
  a first input for receiving the phase signal from a phase node;
  a second input for receiving the low-side over-current signal from a set node;
  second and third inputs connected to the power ground signal;
  a first capacitor for storing a first difference signal representing a difference between the low-side over-current signal and the power ground signal;
  a second capacitor for storing a second difference signal representing a difference between the power ground signal and the phase signal from the phase node;
  a first differential comparator for amplifying a difference between the first difference signal and the second difference signal;

a third and fourth capacitors for storing an amplified difference between the first difference signal and the second difference signal;

a second differential comparator for further amplifying the amplified difference between the first difference signal and the second difference signal; and a comparator connected to the second differential comparator for generating an over-current protection signal at a first level if the first difference signal is greater than the second difference signal and generating an over-current protection signal at a second level if the first difference signal is less than the second difference signal.

22. The apparatus of claim 15, wherein signals are stored on the first, second, third and fourth capacitors responsive to a first control signal.

23. The apparatus of claim 16, wherein differences between the signals stored on the first, second, third and fourth capacitors are amplified responsive to a second control signal.

* * * * *